United States Patent
Jiang

(10) Patent No.: US 11,834,570 B2
(45) Date of Patent: Dec. 5, 2023

(54) MOLDED ARTICLES, AND METHODS THEREOF

(71) Applicant: Dow Global Technologies LLC, Midland, MI (US)

(72) Inventor: Xian Jiang, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 483 days.

(21) Appl. No.: 17/057,413

(22) PCT Filed: May 28, 2019

(86) PCT No.: PCT/US2019/034179
§ 371 (c)(1),
(2) Date: Nov. 20, 2020

(87) PCT Pub. No.: WO2019/231916
PCT Pub. Date: Dec. 5, 2019

(65) Prior Publication Data
US 2021/0206953 A1    Jul. 8, 2021

Related U.S. Application Data

(60) Provisional application No. 62/678,558, filed on May 31, 2018.

(51) Int. Cl.
C08L 23/08 (2006.01)
C08L 23/12 (2006.01)
(Continued)

(52) U.S. Cl.
CPC ........ C08L 23/0876 (2013.01); B29C 43/003 (2013.01); B29C 43/02 (2013.01);
(Continued)

(58) Field of Classification Search
CPC ............................ C08L 23/0876; C08L 23/12
See application file for complete search history.

(56) References Cited

U.S. PATENT DOCUMENTS 2,897,183 A    7/1959   Christl et al.
3,404,134 A   10/1968   Watkin
(Continued)

FOREIGN PATENT DOCUMENTS

EP    3770213 A1    1/2021
JP    2000129050    5/2000
(Continued)

OTHER PUBLICATIONS

PCT/US2019/034179, International Search Report and Written Opinion dated Sep. 4, 2019.
(Continued)

*Primary Examiner* — Marc S Zimmer
*Assistant Examiner* — Surbhi M Du

(57) ABSTRACT

A molded article formed from a blend, the blend comprising: from 1 wt. % to 30 wt. % of a polypropylene; and from 60 wt. % to 99 wt. % of an ionomer formed from a partially neutralized precursor acid copolymer, wherein the precursor acid copolymer (a) comprises copolymerized units of ethylene and 5 wt. % to 30 wt. %, based on the total weight of the precursor acid copolymer, of copolymerized units of an ?,?-ethylenically unsaturated carboxylic acid having 3 to 8 carbon atoms, and (b) has a melt index, I2, (according to ASTM D1238 at 190 C, 2.16 kg) of 10 g/10 min to 4,000 g/10 min, and wherein about 25% to about 65% of the acid groups derived from the ?,?-ethylenically unsaturated carboxylic acid of the precursor acid copolymer are neutralized.

14 Claims, 1 Drawing Sheet

(51) Int. Cl.
  *B29C 43/00* (2006.01)
  *B29C 43/02* (2006.01)
  *B29C 45/00* (2006.01)
  *B29C 45/56* (2006.01)
  *C08L 23/02* (2006.01)
  *B29L 31/00* (2006.01)

(52) U.S. Cl.
  CPC ........ *B29C 45/0001* (2013.01); *B29C 45/561* (2013.01); *C08L 23/02* (2013.01); *B29L 2031/712* (2013.01); *B29L 2031/718* (2013.01); *C08L 2201/10* (2013.01); *C08L 2205/02* (2013.01)

(56) References Cited

U.S. PATENT DOCUMENTS

| | | | |
|---|---|---|---|
| 4,539,263 A | 9/1985 | Hoh | |
| 4,550,141 A * | 10/1985 | Hoh | B32B 27/30 525/196 |
| 4,962,148 A | 10/1990 | Orikasa et al. | |
| 5,028,674 A | 7/1991 | Hatch et al. | |
| 6,518,365 B1 | 2/2003 | Powell et al. | |
| 7,498,282 B2 | 3/2009 | Patel et al. | |
| 8,058,373 B2 | 11/2011 | Stevens et al. | |
| 8,334,033 B2 * | 12/2012 | Hausmann | B32B 17/10743 525/196 |
| 2010/0112251 A1 | 5/2010 | Shelby et al. | |
| 2010/0166992 A1 * | 7/2010 | Hausmann | B32B 17/10036 525/196 |
| 2015/0376310 A1 * | 12/2015 | Meerscheidt | C08F 210/02 525/384 |
| 2017/0355840 A1 * | 12/2017 | Hu | B29C 35/02 |
| 2021/0024732 A1 | 1/2021 | Nishijima et al. | |

FOREIGN PATENT DOCUMENTS

| | | |
|---|---|---|
| JP | 200739533 | 2/2007 |
| JP | 200879669 | 4/2008 |
| WO | 2010/051523 A1 | 5/2010 |
| WO | 2013/074087 A1 | 5/2013 |
| WO | 2016/089647 A1 | 6/2016 |
| WO | 2017/003762 A1 | 1/2017 |

OTHER PUBLICATIONS

PCT/US2019/034179, International Preliminary Report on Patentability dated Dec. 10, 2020.

* cited by examiner

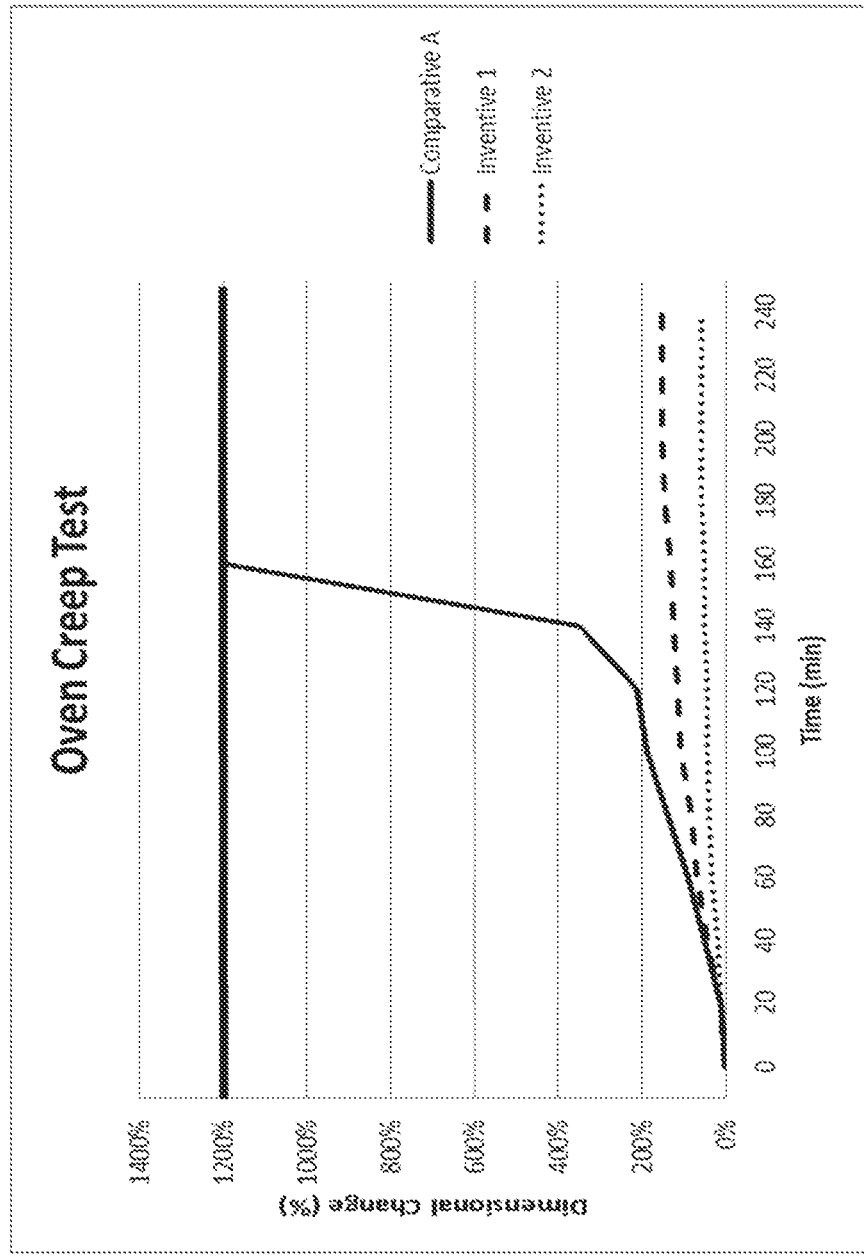

MOLDED ARTICLES, AND METHODS THEREOF

TECHNICAL FIELD

Embodiments of the present disclosure generally relate to molded articles, and more particularly to molded articles having improved properties.

BACKGROUND

Historically, in cosmetics packaging, glass containers were often used due to its scratch-resistance, transparency, hardness, and chemical resistance properties. Use of glass containers is not without its limitations as it is relatively expensive to use, and in some cases, it can be cost prohibitive. Glass is fairly dense and tends to be heavy in weight, and thus shipping costs can be increased. In addition, while glass may be fairly resistant to nicks and scratches on its surface, glass is brittle.

Plastic cosmetics packaging, through the use of ionomers, may overcome some of the deficiencies of glass packaging. Because ionomers are thermoplastic, however, the possibility of deformation, flow or creep of ionomers under high-temperature operating conditions (e.g., injection molding processes) has led to some limitations in use of ionomers. Further, containers produced by injection molding processes may often have thick wall structures. When ionomers are used in forming such injection molded containers, the optical properties may suffer due to the thickness of the wall.

Accordingly, it may be desirable to produce ionomer compositions with improved heat deflection temperature; improved stiffness/modulus at room temperature and at elevated temperatures below the melting point of the ionomer; improved upper use temperature at a given stiffness; and improved long term creep at elevated temperatures; all of which may be improved while maintaining good optical properties.

SUMMARY

Disclosed in embodiments herein are molded articles formed from a blend. The blend comprises from 1 wt. % to 30 wt. % of a polypropylene; and from 60 wt. % to 99 wt. % of an ionomer formed from a partially neutralized precursor acid copolymer, wherein the precursor acid copolymer (a) comprises copolymerized units of ethylene and 5 wt. % to 30 wt. %, based on the total weight of the precursor acid copolymer, of copolymerized units of an $\alpha,\beta$-ethylenically unsaturated carboxylic acid having 3 to 8 carbon atoms, and (b) has a melt index, I1, (according to ASTM D1238 at 190° C., 2.16 kg) of 10 g/10 min to 4,000 g/10 min, and wherein about 25% to about 65% of the acid groups derived from the $\alpha,\beta$-ethylenically unsaturated carboxylic acid of the precursor acid copolymer are neutralized.

Also disclosed in embodiments herein are methods of manufacturing molded articles. The methods comprise providing a blend comprising from 1 wt. % to 30 wt. % of a polypropylene; and from 60 wt. % to 99 wt. % of an ionomer formed from a partially neutralized precursor acid copolymer, wherein the precursor acid copolymer (a) comprises copolymerized units of ethylene and 5 wt. % to 30 wt. %, based on the total weight of the precursor acid copolymer, of copolymerized units of an $\alpha,\beta$-ethylenically unsaturated carboxylic acid having 3 to 8 carbon atoms, and (b) has a melt index, I1, (according to ASTM D1238 at 190° C., 2.16 kg) of 10 g/10 min to 4,000 g/10 min, and wherein about 25% to about 65% of the acid groups derived from the $\alpha,\beta$-ethylenically unsaturated carboxylic acid of the precursor acid copolymer are neutralized; and molding the blend into a molded article.

Additional features and advantages of the embodiments will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing and the following description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 1 graphically depicts the oven creep test results for exemplary blends according to one or more embodiments shown or described herein, and a comparative resin.

DETAILED DESCRIPTION

Reference will now be made in detail to embodiments of molded articles formed from a blend as further described herein. The blend may be injection molded, compression molded, or blow molded into articles for use as cosmetic containers (e.g., caps, bottles, tubs or thick-walled containers). It is noted, however, that this is merely an illustrative implementation of the embodiments described herein. The embodiments are applicable to other technologies that are susceptible to similar problems as those discussed above. For example, the molded articles described herein may be used in other applications, such as, cell phone covers and cases, and automotive interior components.

Blend

The blend comprises a polypropylene and an ionomer. The blend comprises from 1 wt. % to 30 wt. % of the polypropylene and from 60 wt. % to 99 wt. % of the ionomer. All individual values and subranges of from 1 wt. % to 30 wt. % of the polypropylene and from 60 wt. % to 99 wt. % of the ionomer are included and disclosed herein. For example, in some embodiments, the blend contains from 1 wt. %, from 3 wt. %, or from 5 wt. % to 30 wt. %, to 25 wt. %, to 20 wt. %, or to 15 wt. %, of polypropylene, based on the total weight of the blend, and from 60 wt. %, from 65 wt. %, from 75 wt. % from 80 wt. %, or from 85 wt. % to 99 wt. %, to 97 wt. %, or to 95 wt. % of ionomer, based on the total weight of the blend. In other embodiments the blend contains from 1 wt. % to 30 wt. %, from 3 wt. % to 30 wt. %, from 3 wt. % to 20 wt. %, from 3 wt. % to 15 wt. % of polypropylene, based on the total weight of the blend, and from 60 wt. % to 99 wt. %, from 60 wt. % to 97 wt. %, from 70 wt. % to 97 wt. %, or from 80 wt. % to 97 wt. % of ionomer, based on the total weight of the blend. In further embodiments, the blend contains from 5 wt. % to 30 wt. %, from 5 wt. % to 20 wt. %, or from 5 wt. % to 15 wt. % of polypropylene, based on the total weight of the blend, and from 60 wt. % to 95 wt. %, from 70 wt. % to 95 wt. %, from 80 wt. % to 95 wt. %, or from 85 wt. % to 95 wt. % of ionomer, based on the total weight of the blend.

Polypropylene

The polypropylene may be a polypropylene homopolymer, a random propylene/α-olefin copolymer, or a combination thereof. In some embodiments herein, the polypropylene is a polypropylene homopolymer. The polypropylene homopolymer contains 100 wt. % units derived from propylene, based on the total weight of the polypropylene homopolymer. The polypropylene homopolymer may a density of from 0.890 g/cc to 0.910 g/cc and/or a melt flow rate (as determined according to ASTM D1238 at 230° C., 2.16 kg) of from 1 g/10 min to 500 g/10 min. All individual values and subranges of from 0.890 g/cc to 0.910 g/cc and/or from 1 g/10 min to 500 g/10 min are included and disclosed herein. For example, in some embodiments herein, the polypropylene homopolymer has one or both of the following properties: (a) a density from 0.890 g/cc to 0.908 g/cc, 0.895 g/cc to 0.910 g/cc, or 0.895 g/cc to 0.908 g/cc; and/or (b) a melt flow rate (as determined according to ASTM D1238 at 230° C., 2.16 kg) of from a lower limit of 1 g/10 min, 3 g/10 min, or 5 g/10 min to an upper limit of 200 g/10 min, 100 g/10 min, 50 g/10 min, 35 g/10 min, 30 g/10 min, or 20 g/10 min. Non-limiting examples of suitable polypropylene homopolymers include H2UFO, available from Washington Penn Plastic Co., Inc. (Washington, Pa.); PRO-FAX™ PD702, available from LyondellBasell Industries N.V. (Houston, Tex.); D080T, available from Braskem S.A. (Brazil); 1104A, available from Pinnacle Polymers Company (Garyville, La.); or 3721WZ or PPR 7220, available from Total S.A. (France). Further non-limiting examples of suitable polypropylene homopolymers include those produced with metallocene technology, such as ACHIEVE™ Advanced PP1605, available from ExxonMobil Chemical Company (Spring, Tex.), METOCENE™ HM2089, available from LyondellBasell Industries N.V. (Houston, Tex.).

In some embodiments, the polypropylene is a random propylene/α-olefin copolymer. As used herein, the term "copolymer" refers to polymers comprising copolymerized units resulting from copolymerization of two comonomers. The copolymer may be described herein with reference to its constituent comonomers and/or to the amounts of its constituent comonomers, for example "a copolymer comprising propylene and 15 wt. % of α-olefin", or a similar description. Non-limiting examples of suitable α-olefins include $C_2$ and $C_4$-$C_{20}$ α-olefins, or $C_4$-$C_{10}$ α-olefins, or $C_4$-$C_8$ α-olefins. Representative α-olefins include ethylene, 1-butene, 1-pentene, 1-hexene, 1-heptene and 1-octene. In some embodiments, the polypropylene does not contain an aromatic comonomer polymerized therein. In some embodiments, the random propylene/α-olefin copolymer is a propylene/ethylene copolymer.

In some embodiments, the random propylene/α-olefin copolymer comprises greater than 50 wt. % of the units derived from propylene and a reciprocal amount of units derived from α-olefin, based on the total wt. % units of the propylene/α-olefin copolymer. All individual values and subranges of greater than 50 wt. % of the units derived from propylene and a reciprocal amount of units derived from α-olefin are included and disclosed herein. For example, in some embodiments herein, the random propylene/α-olefin copolymer comprises from a lower limit of 60 wt. %, 70 wt. % 75 wt. % 80 wt. %, 85 wt. %, or 90 wt. % to an upper limit of 99 wt. %, 97 wt. %, 95 wt. %, 90 wt. %, 80 wt. %, or 70 wt. % of units derived from propylene, and a reciprocal amount of units derived from α-olefin, based on the total wt. % units of the propylene/α-olefin copolymer. The reciprocal amount of units derived from α-olefin may include less than 50 wt. %, or from a lower limit of 1 wt. %, 3 wt. %, 5 wt. %, 10 wt. %, 15 wt. %, 20 wt. %, or 30 wt. % to an upper limit of 49 wt. %, 40 wt. %, 30 wt. %, 25 wt. %, 20 wt. %, 15 wt. % or 10 wt. % of units derived from α-olefin, based on the total wt. % units of the propylene/α-olefin copolymer. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference.

In some embodiments herein, the random propylene/α-olefin copolymer may have a density of from 0.890 g/cc to 0.910 g/cc and/or a melt flow rate (as determined according to ASTM D1238 at 230° C., 2.16 kg) of from 1 g/10 min to 500 g/10 min. All individual values and subranges of from 0.890 g/cc to 0.910 g/cc and/or from 1 g/10 min to 500 g/10 min are included and disclosed herein. For example, in some embodiments herein, the random propylene/α-olefin copolymer has one or both of the following properties: (a) a density of from 0.890 g/cc to 0.908 g/cc, 0.895 g/cc to 0.910 g/cc, or 0.895 g/cc to 0.908 g/cc; and/or (b) a melt flow rate (as determined according to ASTM D1238 at 230° C., 2.16 kg) of from a lower limit of 1 g/10 min, 3 g/10 min, or 5 g/10 min to an upper limit of 200 g/10 min, 100 g/10 min, 50 g/10 min, 35 g/10 min, 30 g/10 min, or 20 g/10 min. Non-limiting examples of suitable random propylene/α-olefin copolymer include PRO-FAX™ RP323M or RP448S, available from LyondellBasell Industries N.V. (Houston, Tex.), or 7823MZ, available from Total S.A. (France).

The polypropylenes described herein may be prepared by various methods known in the art, for example, in a single step or in multiple steps, by a polymerization method such as slurry polymerization, gas phase polymerization, bulk polymerization, solution polymerization, or a combination thereof, using a metallocene catalyst or a Ziegler-Natta catalyst, which is usually a catalyst comprising a solid titanium transition metal component. Other exemplary methods to prepare polypropylene may be found in WO 2013/074087, U.S. Pat. No. 8,058,373, and WO 2017/003762, which are incorporated herein by reference.

The blend may contain one or more polypropylene embodiments described herein. For example, in some embodiments, the blend includes at least two polypropylenes, wherein each polypropylene differs from one another compositionally, structurally, and/or physically. In embodiments where at least two polypropylenes are present in the blend, the blend comprises from 1 wt. % to 30 wt. % of the at least two polypropylenes.

Ionomer

Disclosed in embodiments herein is an ionomer formed from a partially neutralized precursor acid copolymer. The precursor acid copolymer (a) comprises copolymerized units of ethylene and from 5 wt. % to 30 wt. %, based on the total wt. % of the precursor acid copolymer, of copolymerized units of an α,β-ethylenically unsaturated carboxylic acid having 3 to 8 carbon atoms. All individual values and subranges of from 5 wt. % to 30 wt. % are included and disclosed herein. For example, in some embodiments, the precursor acid copolymer (a) comprises copolymerized units of ethylene and from 5 wt. % to 25 wt. %, from 7 wt. % to 25 wt. %, or from 7 wt. % to 22 wt. %, based on the total wt. % of the precursor acid copolymer, of copolymerized units of an α,β-ethylenically unsaturated carboxylic acid having 3 to 8 carbon atoms. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference.

Examples of suitable α,β-unsaturated carboxylic acids having 3 to 8 carbon atoms may include, without limitation, acrylic acids, methacrylic acids, itaconic acids, maleic acids, fumaric acids, monomethyl maleic acids, and combinations of two or more of these acid comonomers. In some embodiments, the α,β-unsaturated carboxylic acids having 3 to 8 carbon atoms comprises acrylic acid and methacrylic acid. In other embodiments, the α,β-unsaturated carboxylic acids having 3 to 8 carbon atoms comprises acrylic acid.

The precursor acid copolymer has a melt index, I1, of 10 g/10 min to 4,000 g/10 min. The melt index, I1, is determined according to ASTM D1238 at 190° C., 2.16 kg. All individual values and subranges of 10 g/10 min to 4,000 g/10 min are included and disclosed herein. For examples, in some embodiments, the precursor acid copolymer may have a melt index, I1, of 10 g/10 min to 2,500 g/10 min, 10 g/10 min to 1,250 g/10 min, 25 g/10 min to 1,000 g/10 min, 25 g/10 min to 750 g/10 min, 50 g/10 min to 500 g/10 min, or 100 g/10 min to 450 g/10 min.

The precursor acid copolymers may be synthesized in a continuous process in which each of the reactive comonomers and the solvent(s), if any, are continuously fed, together with initiator, into a stirred reactor. The choice of initiator is based on the anticipated reactor temperature range coupled with the decomposition temperature of the initiator, the criteria for this selection being well-understood in the industry. In general, during the synthesis by copolymerization of ethylene and acid comonomers to produce the precursor acid copolymer, the reaction temperature may be maintained at about 120° C. to about 300° C., or about 140° C. to about 260° C. The pressure in the reactor may be maintained at about 130 to about 310 MPa, or about 165 to 250 MPa.

The reactor may be, for example, an autoclave reactor, such as those described in U.S. Pat. No. 2,897,183, which describes a type of autoclave reactor that is equipped with means for intensive agitation. The patent also describes a continuous process for the polymerization of ethylene under a "substantially constant environment." This environment is maintained by keeping certain parameters, for example, pressure, temperature, initiator concentration, and the ratio of polymer product to unreacted ethylene, substantially constant during the polymerization reaction. Such conditions may be achieved in any of a variety of continuously stirred tank reactors, among them, for example, continuously stirred isothermal reactors and continuously stirred adiabatic reactors.

The reaction mixture, which contains the precursor acid copolymer, is vigorously agitated and continuously removed from the autoclave. After the reaction mixture leaves the reaction vessel, the resulting precursor acid copolymer product is separated from the volatile unreacted monomers and solvent(s), if any, by conventional procedures, such as by vaporizing the unpolymerized materials and solvent(s) under reduced pressure or at an elevated temperature. Non-limiting examples of precursor acid copolymers include NUCREL™ 0403, 0903, or 0910, available from E.I. du Pont de Nemours and Company, Inc. (Wilmington, Del. U.S.A.).

In general, to obtain the ionomers described herein, during the polymerization reaction, the reactor contents should be maintained under conditions such that a single phase is present substantially throughout the reactor. This can be accomplished by adjusting reactor temperature, by adjusting reactor pressure, by addition of co-solvents, or by any combination of these techniques, as described in U.S. Pat. No. 5,028,674. Conventional means may be used to determine whether a single phase is maintained substantially throughout the reactor. For example, Hasch et al., in "High-Pressure Phase Behavior of Mixtures of Poly(Ethylene-co-Methyl Acrylate) with Low-Molecular Weight Hydrocarbons," Journal of Polymer Science: Part B: Polymer Physics, Vol. 30, 1365-1373 (1992), describe a cloud-point measurement that can be used in determining the boundary between single phase and multiphase conditions.

To obtain the ionomers useful in the blends described herein, the precursor acid copolymers are neutralized with a base comprising a metal cation such that the acid groups (e.g., carboxylic acid) in the precursor acid copolymer react to form acid salt groups (e.g., carboxylate salts). In embodiments herein, about 25% to about 65%, or about 30% to about 60%, or about 35% to about 60%, or about 30% to about 55%, or about 35% to about 55% of the acid groups derived from the α,β-ethylenically unsaturated carboxylic acid of the precursor acid copolymer are neutralized. The neutralization level of the acid groups derived from the α,β-ethylenically unsaturated carboxylic acid of the precursor acid copolymer may be calculated based on the amount of basic metal compound added or measured using infra-red spectroscopy. Actual neutralization levels may be determined using infra-red spectroscopy by comparing an absorption peak attributable to carboxylate anion stretching vibrations at 1530 to 1630 cm$^{-1}$ and an absorption peak attributable to carbonyl stretching vibrations at 1690 to 1710 cm$^{-1}$. The amount of basic metal compound capable of neutralizing acidic groups may be provided by adding the stoichiometric amount of the basic compound calculated to neutralize a target amount of acid moieties in the acid copolymer. Non-limiting examples of ionomers include SURLYN™ PC-350, PC-2000, and PC-2200, available from E.I. du Pont de Nemours and Company, Inc. (Wilmington, Del. U.S.A.)

Any stable cation and any combination of two or more stable cations are believed to be suitable as counterions to the acid groups in the ionomer. Divalent and monovalent cations, such as cations of alkali metals, alkaline earth metals, and some transition metals, may be used. In some embodiments, the cation is a divalent cation (e.g., such as, zinc, calcium, or magnesium). In other embodiments, the cation is a monovalent cation (e.g., potassium or sodium). In further embodiments, the acid groups derived from the α,β-ethylenically unsaturated carboxylic acid of the precursor acid copolymer are neutralized by a sodium-ion-containing base. This can provide a sodium ionomer wherein the hydrogen atoms of the acid groups of the precursor acid are replaced by sodium cations. To obtain the ionomers used herein, the precursor acid copolymers may be neutralized by any conventional procedure, such as those described in U.S. Pat. Nos. 3,404,134 and 6,518,365.

The ionomer may have a melt index, I1, of 0.1 g/10 min to 20 g/10 min. All individual values and subranges of 0.1 g/10 min to 20 g/10 min are included and disclosed herein. For example, in some embodiments, the ionomer may have a melt index, I1, of 0.5 g/10 min to 18 g/10 min, 1.0 g/10 min to about 15 g/10 min, or 3 g/10 min to 15 g/10 min, as determined in accordance with ASTM method D1238 at 190° C. and 2.16 kg.

Further, the ionomer may have a freeze enthalpy that is not detectable or less than about 3.0 J/g, as determined by differential scanning calorimetry (DSC) in accordance with ASTM method D3418 when using a DSC apparatus manufactured by Mettler or by TA (for example the Universal V3.9A model). All individual values and subranges of not detectable or less than about 3.0 J/g are included and disclosed herein. For example, in some embodiments, the ionomer may have a freeze enthalpy that is not detectable or less than about 2 J/g. As used herein, "not detectable," refers to a freeze enthalpy that produces no observable inflection in the DSC curve. Alternatively, the peak height may be very small and the peak width at half height may be relatively great, so that a broad peak having a small integral area may not be detectable or discernable when a baseline is subtracted from the DSC trace. In general, when ASTM D3418 is followed, a freeze enthalpy that falls below 0.2 J/g is considered to be not detectable.

Molded Articles

The molded article is formed from the blends described herein, and may be formed using processes, such as, injection molding, blow molding, transfer molding, casting, extrusion molding, overmolding, compression molding, or cavity molding the composition. In some embodiments, the molded article is an injection molded article. In other embodiments, the molded article is a compression molded article.

In some embodiments herein, a method of manufacturing molded articles, the method comprises providing a blend comprising from 1 wt. % to 30 wt. % of a polypropylene; and from 60 wt. % to 99 wt. % of an ionomer formed from a partially neutralized precursor acid copolymer, wherein the precursor acid copolymer (a) comprises copolymerized units of ethylene and 5 wt. % to 30 wt. %, based on the total weight of the precursor acid copolymer, of copolymerized units of an α,β-ethylenically unsaturated carboxylic acid having 3 to 8 carbon atoms, and (b) has a melt index, I1, (according to ASTM D1238 at 190° C., 2.16 kg) of 10 g/10 min to 4,000 g/10 min, and wherein about 25% to about 65% of the acid groups derived from the α,β-ethylenically unsaturated carboxylic acid of the precursor acid copolymer are neutralized; and molding the blend into a molded article. As previously mentioned, molding may be achieved by, injection molding or compression molding.

The molded articles may exhibit at least one of the following properties: an internal haze of less than or equal to 35%; an oven creep of less than 1,200% elongation after 160 minutes; or a heat deflection temperature (HDT) of greater than 35° C.

The embodiments described herein may be further illustrated by the following non-limiting examples.

Test Methods

Unless otherwise stated, the following test methods are used.

Density

Density is determined according to ASTM D792, and reported in grams per cubic centimeter (or g/cc).

Melt Index

Melt index, or I2, is determined according to ASTM D1238 at 190° C., 2.16 kg, and reported in grams per ten minutes (or g/10 min).

Melt Flow Rate

Melt flow rate, or MFR, is determined according to ASTM D1238 at 230° C., 2.16 kg, and reported in grams per ten minutes (or g/10 min).

Freeze Enthalpy

Freeze enthalpy is determined by differential scanning calorimetry (DSC) in accordance with ASTM D3418, when using a DSC apparatus manufactured by Mettler or by TA (for example the Universal V3.9A model), and reported in Joules/gram (or J/g).

Internal Haze

Internal haze is determined according to ASTM D1003, and reported in %. The samples are compression molded at 210° C. into 6 in.×6 in.×10 mil. (L×W×T) films by a hot press and then cooled down to room temperature by water cooling for the haze measurement.

Oven Creep Test

Film samples having a thickness of 10 mils, a length of three inches, and a width of one inch are prepared by compression molding at 210° C. The film samples are suspended in an oven at a temperature 85° C., and a 30-gram weight is attached to a film sample. The % dimensional change is calculated by the change of film length divided by the original film length, and is determined at the time intervals shown in FIG. 1. Test failure occurs if the film elongates to the point of touching the bottom of the oven (i.e., 1200% dimensional change).

Heat Deflection Temperature (HDT)

HDT is determined according to ISO 75 using a 0.45 MPa load, and is reported in ° C.

Tensile Properties

The tensile strength, tensile modulus and elongation at break are measured according to ISO 527. Type 1A testing bars are injection molded for the tensile measurements.

Examples

Materials

TABLE 1

| | Description | Properties |
| --- | --- | --- |
| PPH2UFO, available from Washington Penn Plastic Co., Inc. | polypropylene homopolymer | Density =0.905 g/cc Melt Flow Rate (MFR) = 6.0 g/10 min |
| Precursor acid copolymer | Ethylene methacrylic acid copolymer comprising about 19 wt. % of the methacrylic acid. | Melt Index (I2) = 390 g/10 min |
| Ionomer | Ionomer formed from the precursor acid copolymer, wherein about 39% of the acid groups derived from the methacrylic acid of the precursor acid copolymer are neutralized by a sodium-ion containing base. | Melt Index (I2) = 12 g/10 min |

The ionomer may be prepared as follows: first, the precursor acid copolymers (e.g., the non-neutralized copolymers of ethylene and methacrylic acid) are produced by a free radical polymerization in an adiabatic continuous stirred autoclave, substantially according to the procedure described in Example 1 of U.S. Pat. No. 5,028,674, with the following exceptions: (1) by controlling the ratio of ethylene to methacrylic acid and the flow rate of the initiator, the reactor conditions may be maintained at a temperature of about 200° C. to about 260° C. and at a pressure of between 170 MPa and 240 MPa; (2) no propane telogen is fed in the reactor; (3) the total concentration of methanol in the reactor may be maintained at about 2 to 5 mol. %, based on the total feed of ethylene, methacrylic acid, methanol and initiator solution; and (4) the system is maintained at a steady state with the residence time of the material flowing through the reactor being from about 5 seconds to about 2 minutes. Tert-butyl peracetate is the initiator that may be utilized as a solution in odorless mineral spirits at 50% concentration.

Formulations

TABLE 2

| | Composition |
|---|---|
| Comparative A | 100 wt. % of Ionomer |
| Inventive 1 | 95 wt. % of Ionomer; 5 wt. % of PPH2UFO |
| Inventive 2 | 90 wt. % of Ionomer; 10 wt. % of PPH2UFO |

The formulations of Table 2 are made from melt extrusion (twin screw extruder and the barrel temperature is around 210° C.) and then injection molded into ISO 527 type 1A testing bars for tensile and HDT test or are compression molded into 3 in.×1 in.×10 mil. (L×W×T) and 6 in.×6 in.×10 mil. films for oven creep and internal haze measurements, respectively. The results are shown below in Tables 3 & 4, and FIG. 1. As shown below, Inventive 1 and 2 exhibit much higher tensile properties, HDT, and oven creep resistance while showing minimum reduced transparency (i.e., increased internal haze) as compared to Comparative A.

TABLE 3

| | Tensile Properties | | |
|---|---|---|---|
| | Tensile Strength (MPa) | Tensile Modulus (MPa) | Elongation at Break (%) |
| Comparative A | 23.5 | 486 | 133.7 |
| Inventive 1 | 27.3 | 532 | 216.8 |
| Inventive 2 | 30.8 | 543 | 262.6 |

TABLE 4

| | Properties | | |
|---|---|---|---|
| | Internal Haze (%) | Oven Creep Test (% dimensional change @ 160 minutes) | Heat Deflection Temperature (° C.) |
| Comparative A | 1.8 | 1200%, Failed | 43.2 |
| Inventive 1 | 2.1 | 131% | 48.0 |
| Inventive 2 | 6.1 | 50% | 48.2 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

I claim:

1. A molded article formed from a blend, the blend comprising:
   from 1 wt. % to 30 wt. % of a polypropylene homopolymer; and
   from 60 wt. % to 99 wt. % of an ionomer formed from a partially neutralized precursor acid copolymer, wherein the precursor acid copolymer (a) comprises copolymerized units of ethylene and 5 wt. % to 30 wt. %, based on the total weight of the precursor acid copolymer, of copolymerized units of an α,β-ethylenically unsaturated carboxylic acid having 3 to 8 carbon atoms, and (b) has a melt index, I2, (according to ASTM D1238 at 190° C., 2.16 kg) of 100 g/10 min to 450 g/10 min, and wherein about 25% to about 65% of the acid groups derived from the α,β-ethylenically unsaturated carboxylic acid of the precursor acid copolymer are neutralized; and
   wherein the acid groups derived from the α,β-ethylenically unsaturated carboxylic acid of the precursor acid copolymer are neutralized by a sodium-ion-containing base; and
   wherein the ionomer has a melt index, I2, (according to ASTM D1238 at 190° C., 2.16 kg) of 3 g/10 min to 15 g/10 min; and
   wherein the molded article has an internal haze from 2.1% to 6.1%.

2. The molded article of claim 1, wherein the ionomer has a freeze enthalpy that is not detectable or is less than about 3.0 J/g.

3. The molded article of claim 1, wherein the molded article is an injection molded article.

4. The molded article of claim 1, wherein the molded article is a compression molded article.

5. A method of manufacturing a molded article, the method comprising:
   providing a blend comprising from 1 wt. % to 30 wt. % of a polypropylene homopolymer; and from 60 wt. % to 99 wt. % of an ionomer formed from a partially neutralized precursor acid copolymer, wherein the precursor acid copolymer (a) comprises copolymerized units of ethylene and 5 wt. % to 30 wt. %, based on the total weight of the precursor acid copolymer, of copolymerized units of an α,β-ethylenically unsaturated carboxylic acid having 3 to 8 carbon atoms, and (b) has a melt index, I2, (according to ASTM D1238 at 190° C., 2.16 kg) of 100 g/10 min to 450 g/10 min, and wherein about 25% to about 65% of the acid groups derived from the α,β-ethylenically unsaturated carboxylic acid of the precursor acid copolymer are neutralized; and
   molding the blend into a molded article; and
   wherein the acid groups derived from the α,β-ethylenically unsaturated carboxylic acid of the precursor acid copolymer are neutralized by a sodium-ion-containing base; and
   wherein the ionomer has a melt index, I2, (according to ASTM D1238 at 190° C., 2.16 kg) of 3 g/10 min to 15 g/10 min; and wherein the molded article has an internal haze from 2.1 to 6.1%.

6. The method of claim 5, wherein molding is done by injection molding.

7. The method of claim 5, wherein molding is done by compression molding.

8. The method of claim 5, wherein the ionomer has a freeze enthalpy that is not detectable or is less than about 3.0 J/g.

9. The molded article of claim 1, wherein the molded article has an oven creep (85° C., 30 g) form 50% to 131% elongation after 160 minutes.

10. The molded article of claim 1, wherein the polypropylene homopolymer has a melt flow rate (according to ASTM D1238 at 230° C., 2.16 kg) of 5 g/10 min to 20 g/10 min.

11. The molded article of claim 1, wherein the polypropylene homopolymer has a density from 0.895 g/cc to 0.908 g/cc.

12. The method of claim 5, wherein the molded article has an oven creep (85° C., g) form 50% to 131% elongation after 160 minutes.

13. The method of claim 5, wherein the polypropylene homopolymer has a melt flow rate (according to ASTM D1238 at 230° C., 2.16 kg) of 5 g/10 min to 20 g/10 min.

14. The method of claim 5, wherein the polypropylene homopolymer has a density from 0.895 g/cc to 0.908 g/cc.

* * * * *